United States Patent
Drazic et al.

(10) Patent No.: US 6,837,584 B2
(45) Date of Patent: Jan. 4, 2005

(54) PEAK BRIGHTNESS IMPROVEMENT FOR LC/DLP BASED RPTV

(75) Inventors: Valter Drazic, Betton (FR); Eugene Murphy O'Donnell, Hamilton, IN (US)

(73) Assignee: Thomson Licensing S.A., Boulogne-Billancourt (FR)

(*) Notice: Subject to any disclaimer, the term of this patent is extended or adjusted under 35 U.S.C. 154(b) by 0 days.

(21) Appl. No.: 10/150,349

(22) Filed: May 17, 2002

(65) Prior Publication Data

US 2003/0214637 A1 Nov. 20, 2003

(51) Int. Cl.[7] .................. G03B 21/22; G03B 21/00; G03B 21/14; G03B 21/28; G03B 21/56
(52) U.S. Cl. ................. 353/74; 353/76; 353/77; 353/31; 353/82; 353/98; 348/235; 359/460
(58) Field of Search .................. 353/74, 76–77, 353/30–31, 82, 98; 348/235; 345/61, 65, 63; 359/460

(56) References Cited

U.S. PATENT DOCUMENTS

| | | | |
|---|---|---|---|
| 5,680,257 A | 10/1997 | Anderson | 359/727 |
| 6,005,722 A * | 12/1999 | Butterworth et al. | 359/712 |
| 6,375,330 B1 * | 4/2002 | Mihalakis | 353/31 |
| 6,631,994 B2 * | 10/2003 | Suzuki et al. | 353/77 |
| 2001/0022613 A1 | 9/2001 | Matsui et al. | 348/75 |

FOREIGN PATENT DOCUMENTS

EP 1081964 A2 3/2001 ............ H04N/9/31

* cited by examiner

*Primary Examiner*—Judy Nguyen
*Assistant Examiner*—Magda Cruz
(74) *Attorney, Agent, or Firm*—Joseph S. Tripoli; Harvey D. Fried; Patricia A. Verlangieri

(57) ABSTRACT

A method and apparatus for producing an apparent increase in display brightness in an RPTV engine without an actual increase in total light output. Light is generated with an illumination source and optically processed to produce a light beam of rectangular format. The light beam is formed intentionally to have an intensity that is non-uniform, varying from a peak intensity at a center of the beam to a minimum intensity at a periphery of the beam. The optical processing step can include varying the intensity to selectively produce an illumination profile that decreases by at least about 30% to 70% from the peak intensity to the minimum intensity. The optical processing step can further include projecting the light beam through an integrator that is configured to produce an illumination profile that is at least partially controlled by a length of the integrator. The integrator can be configured so that a decrease in length will result in reduced uniformity.

8 Claims, 5 Drawing Sheets

PEAK BRIGHTNESS IMPROVEMENT FOR LC/DLP BASED RPTV

CROSS REFERENCE TO RELATED APPLICATIONS (Not Applicable)

BACKGROUND OF THE INVENTION

1. Technical Field

The invention concerns improvements in the peak brightness of projection displays, and more particularly to controlling peak brightness by selectively controlling uniformity of screen illumination.

2. Description of the Related Art

Rear projection television (RPTV) engines based on LCD, LCOS or DLP imagers, have an illumination system that performs some very important steps to ensure adequate light throughput. The first one consists in a format conversion. The circular beam of light collected by a reflector is not suitable for illuminating a square imager as too much light would be lost. For this reason, fly-eye lenses and rectangular light pipes are commonly used. These lenses convert the light beam footprint format from circular to rectangular. The second step performed by such RPTV illumination systems is to achieve a very uniform illumination of the imager. This is in fact a natural ability of the light pipe and fly-eye lens. These elements are by principle able to provide a very uniform illumination. This is sound and desirable for data projections where uniform fields are needed for presentations as most of the time the slides have large uniform areas. Data projectors can also place a substantial number of lumens on the screen, since there is less need to cut off the yellow peak of light's spectrum for achieving a very good white balance.

On the other hand, illumination intended to be used for video applications must have an excellent white color and, as they need to be much cheaper, the imagers used tends to be smaller than in data projectors. Hence, due to all these constraints, the light output is more limited. But, video content does not need to have a screen brightness uniformity of 90 to 100% like data projection, and it would be profitable for a TV application, if the center peak brightness of the set could be significantly improved by sacrificing to the uniformity, without losing light power. Light engines that are presently limited to use in RPTVs of smaller screen sizes (40" to 46") because of their limited light output, could be used in bigger screen sized cabinets (50–52") by improving the peak brightness.

SUMMARY OF THE INVENTION

The invention concerns a method and apparatus for producing an increase in a display's peak brightness in an RPTV engine without an actual increase in total light output. Light is generated with a white light illumination source and optically processed to produce a light beam of rectangular format. The light beam is formed intentionally to have an illumination that is non-uniform, varying from a peak an illumination at a center of the beam to a minimum illumination at a periphery of the beam. The optical processing step can include varying the illumination to selectively produce an illumination profile which decreases by at least about 30% to 70% from the peak illumination to the minimum illumination. A light integrator is configured to produce an illumination profile at an end thereof that is at least partially controlled by the length of the integrator. The integrator can be configured so that a decrease in length will result in reduced uniformity. Further, the optical processing step includes an optical relay system that images the non-uniform illumination from the integrator's output onto at least one imager. The imager modulates the light, and there is a projection lens that images the light modulated by the imager onto a screen. The image is presented to the viewer on a diffusing screen made out of a Fresnel lens and a lenticular and its illumination distribution across the screen is shaped into a brightness variation of the same kind, with a peak in the center and decrease of brightness toward the edges.

The invention can also be embodied in the form of an RPTV engine apparatus for providing an increase in display peak brightness without an actual increase in total light output. The apparatus includes an illumination source for generating light and an optical processor. The optical processor can be arranged for converting light generated by the illumination source to a light beam of rectangular format. Further, the optical processor includes an integrator. The integrator produces the rectangular shape and the variation of the illumination from the center to the edge for producing the light beam with an illumination that is non-uniform. In particular, the light integrator can be configured to produce a light beam that varies in illumination from peak illumination at a center of the beam to a minimum illumination at a periphery of the beam. The light integrator can vary the illumination to selectively produce an illumination profile that decreases by at least about 30% to 70% from the peak illumination to the minimum illumination. The integrator component could be a solid glass rod, or a hollow rectangular guide with mirrors on the fours sides of its length. However, other type of integrators can also be used for this purpose and the invention is not intended to be so limited. A lens can be provided for injecting the light beam through the integrator. The length of the integrator can be selected to control the illumination profile. For example the integrator can be decreased in length for reduced uniformity.

DETAILED DESCRIPTION OF THE PREFERRED EMBODIMENTS

Figure 1A:
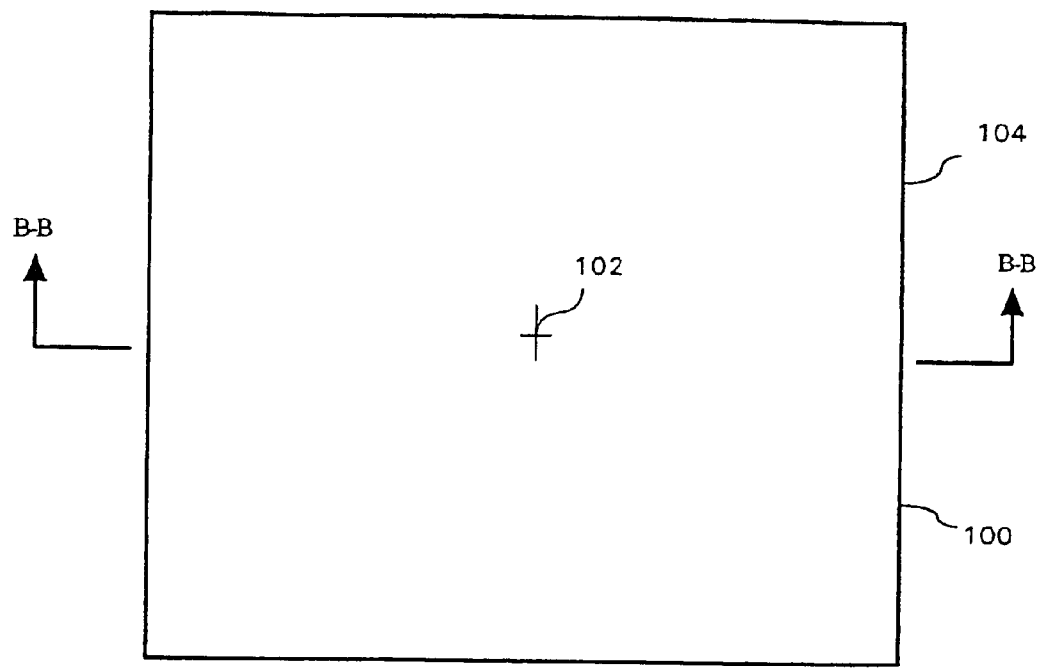
FIG. 1 is an illustration useful for showing a relative intensity of a light beam of rectangular format as produced by a conventional light engine.
Figure 1B:
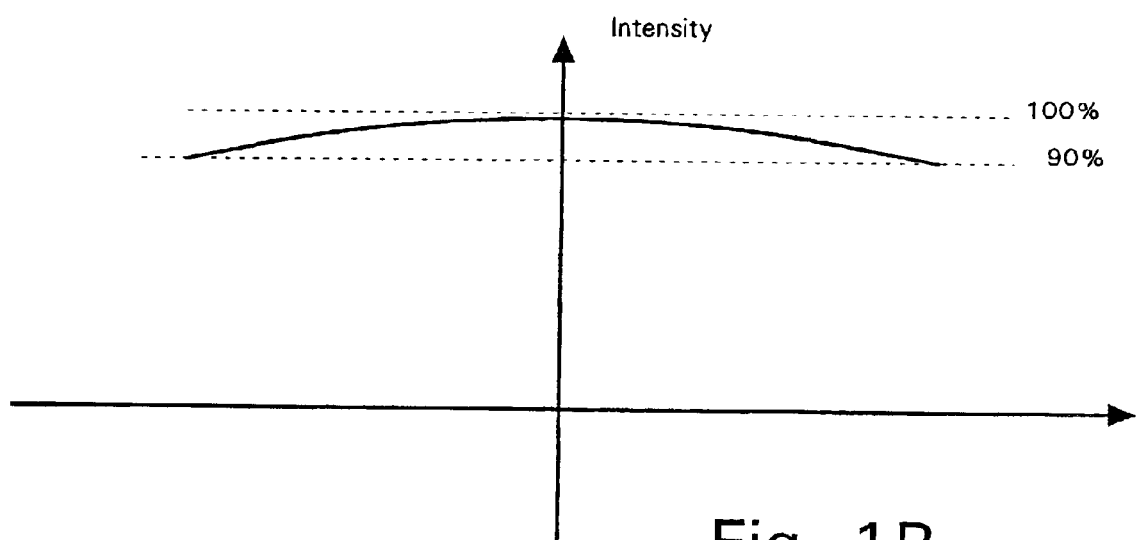

Conventional RPTV light engines are designed to produce a rectangular format light beam that have excellent white color and FIG. 1A is an illustration of a light beam 100 of rectangular format as produced by a conventional RPTV light engine. FIG. 1B is a plot showing the relative intensity of the beam 100 as measured along line B—B in FIG. 1. FIG. 1B illustrates that the relative intensity varies from a peak value of 100 percent at the center 102 of the beam to about 90 percent at the periphery 104 of the beam. In such conventional RPTV systems, the light engines are conventionally designed to produce a beam of maximum uniformity.

Figure 2A:
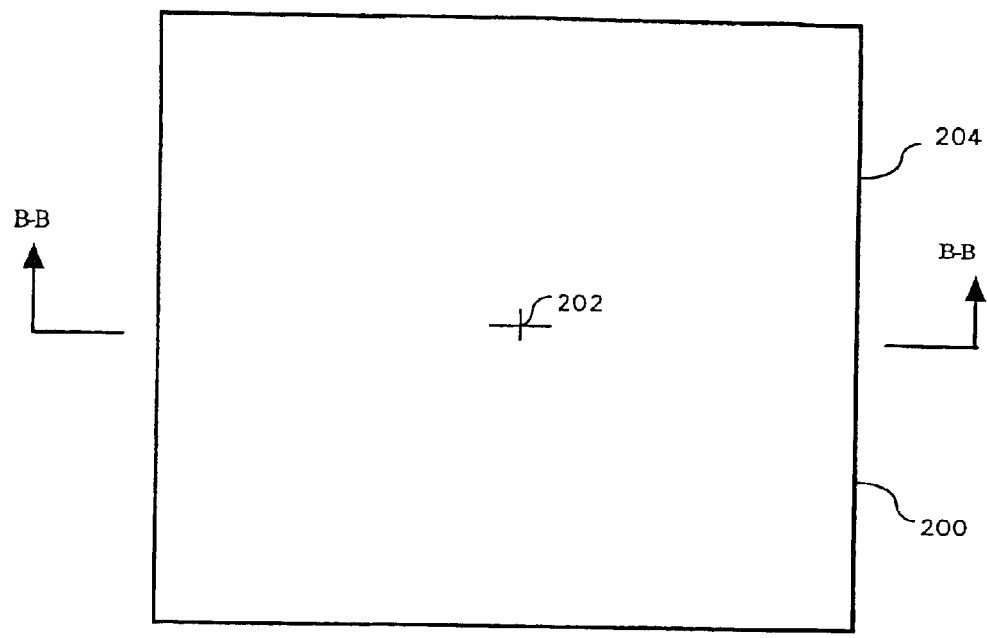
FIG. 2 is an illustration useful for showing a relative intensity of a light beam of rectangular format as produced using the inventive arrangements.
Figure 2B:
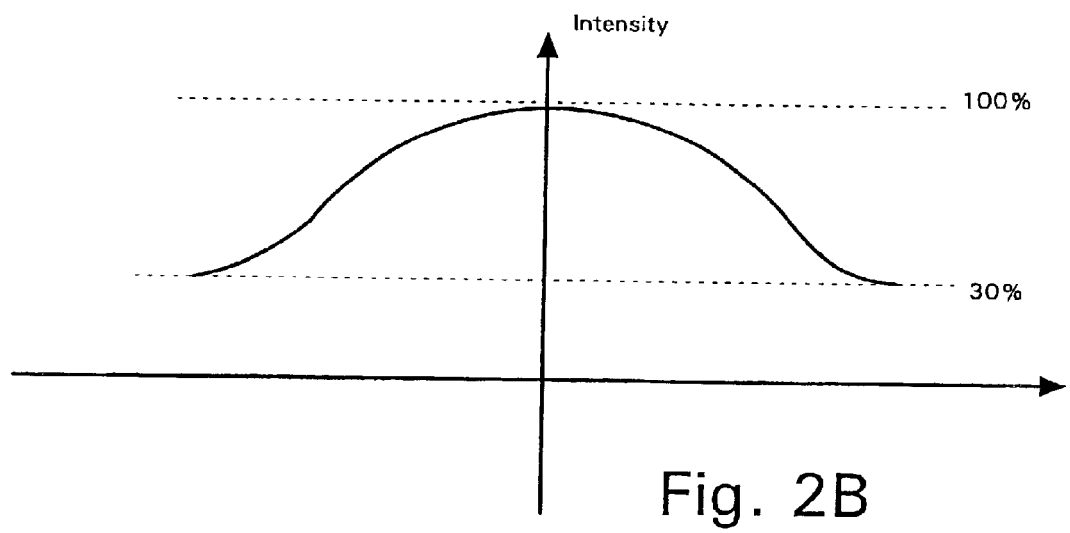

Significantly, however, it has been found that a television viewer's perception of the brightness of a viewing screen can be more heavily influenced by the intensity at the center of the screen as compared to the peripheral edge of the screen. Accordingly, a viewer can have a perception of a brighter screen by causing a greater light beam intensity to appear in the center of the screen and having a larger degradation in brightness at a peripheral edge. Accordingly, FIG. 2A shows a light beam 200 of rectangular format as produced using the inventive arrangements. The intensity of the light beam 200 as considered along lines B—B is illustrated in FIG. 2B. FIG. 2 shows that the intensity at a peripheral edge 204 of the beam 200 can be considerably less than the peak intensity at the center 202 without a significant degradation in the viewing experience. More particularly, the intensity at the peripheral screen edge 204 can be from between about 30 percent to 70 percent less than the peak brightness in the center 202 of the screen.

Figure 3:
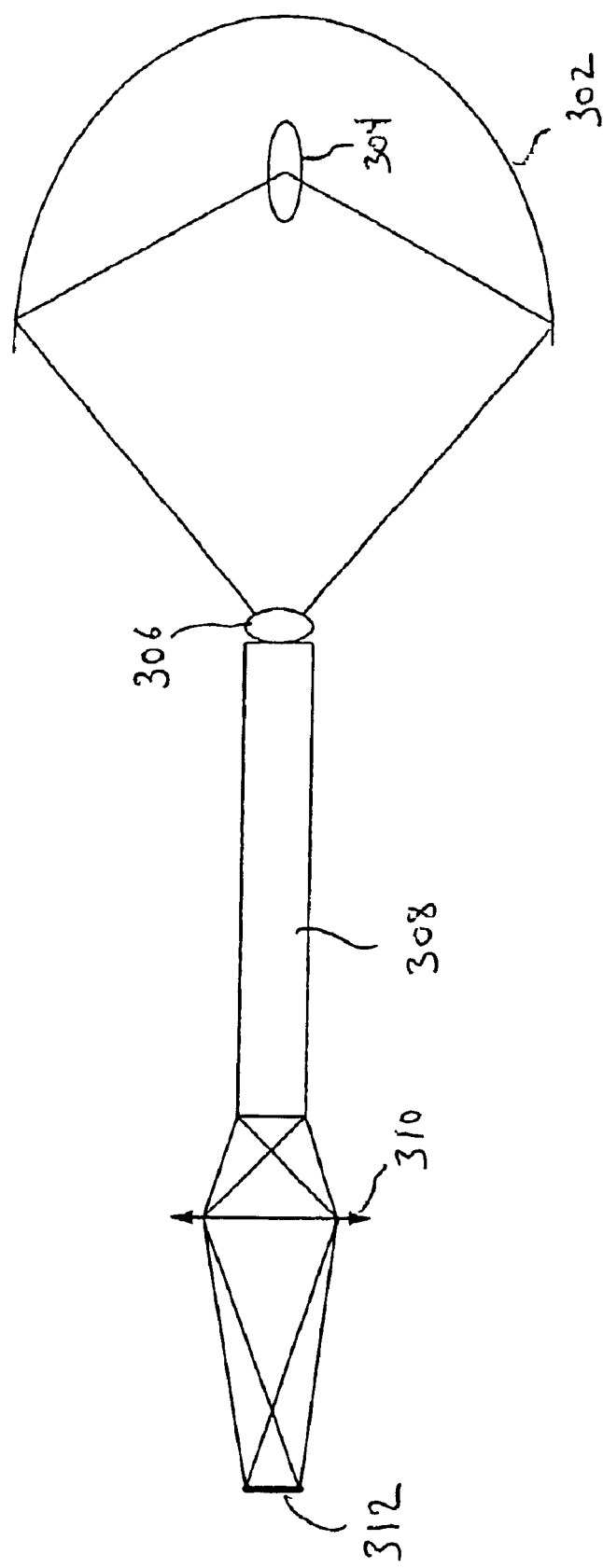
FIG. 3 is a illustration useful for showing how light from a light source can be processed to form a light beam in an RPTV.

FIG. 3 is a illustration of a light engine that is useful for showing how light from a light source 304 can be processed to form a light beam in an RPTV. The light engine can include a reflector 302, an integrator 308 and a lens 306 for injecting light from the reflector into the integrator. The integrator 308 can be a solid glass rod, or a hollow rectangular guide with mirrors on the fours sides of its length. However, other type of integrators can also be used for this purpose and the invention is not intended to be so limited. The integrator is typically made sufficiently long to produce a resulting light beam that is rectangular and very uniform in its intensity. After the light passes through the integrator 308, it typically passes through further optical elements such as a lens 310. Finally the light beam is projected onto at least one imager 312. In many instances, more than one imager can be used. For example, the light beam can be projected on three imagers.

Figure 4:
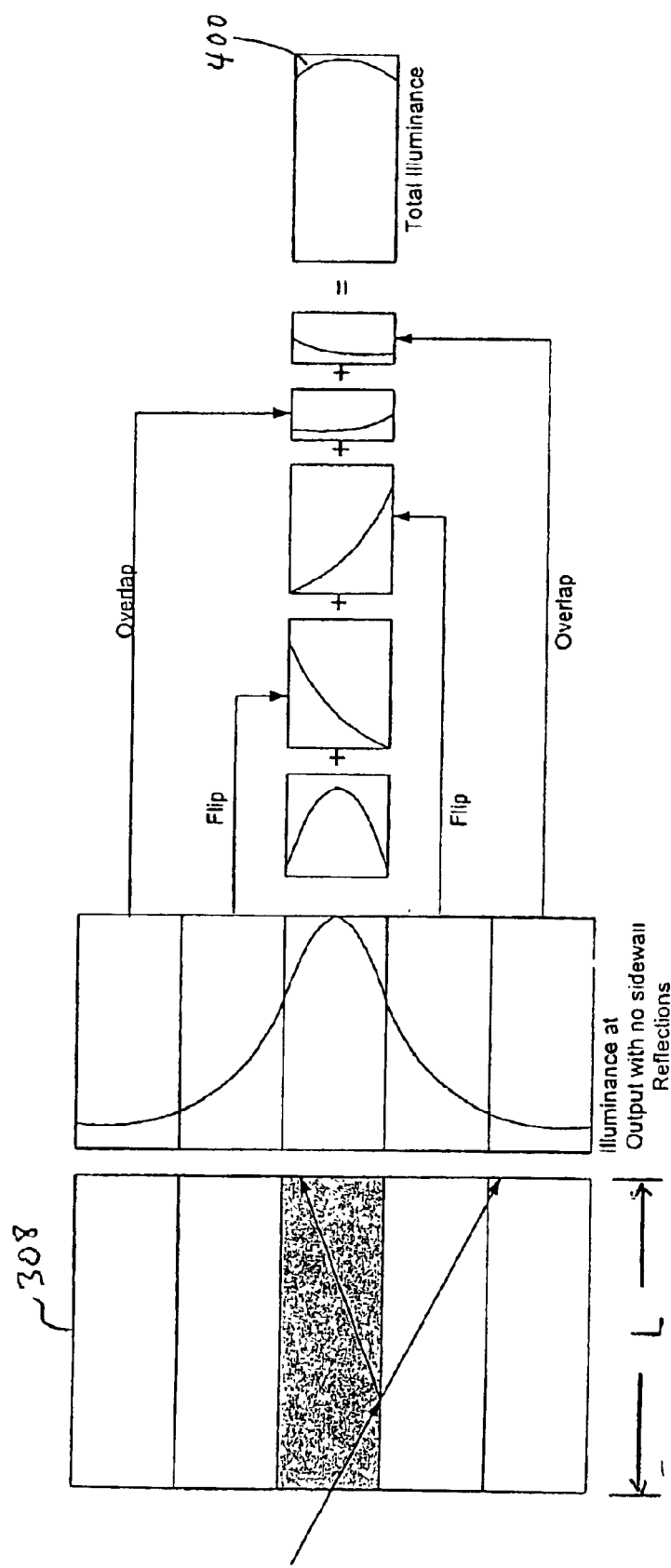
FIG. 4 is a graphical representation of a flip and fold construction that is useful for showing total illuminance produced by a conventional RPTV light engine.
Figure 5:
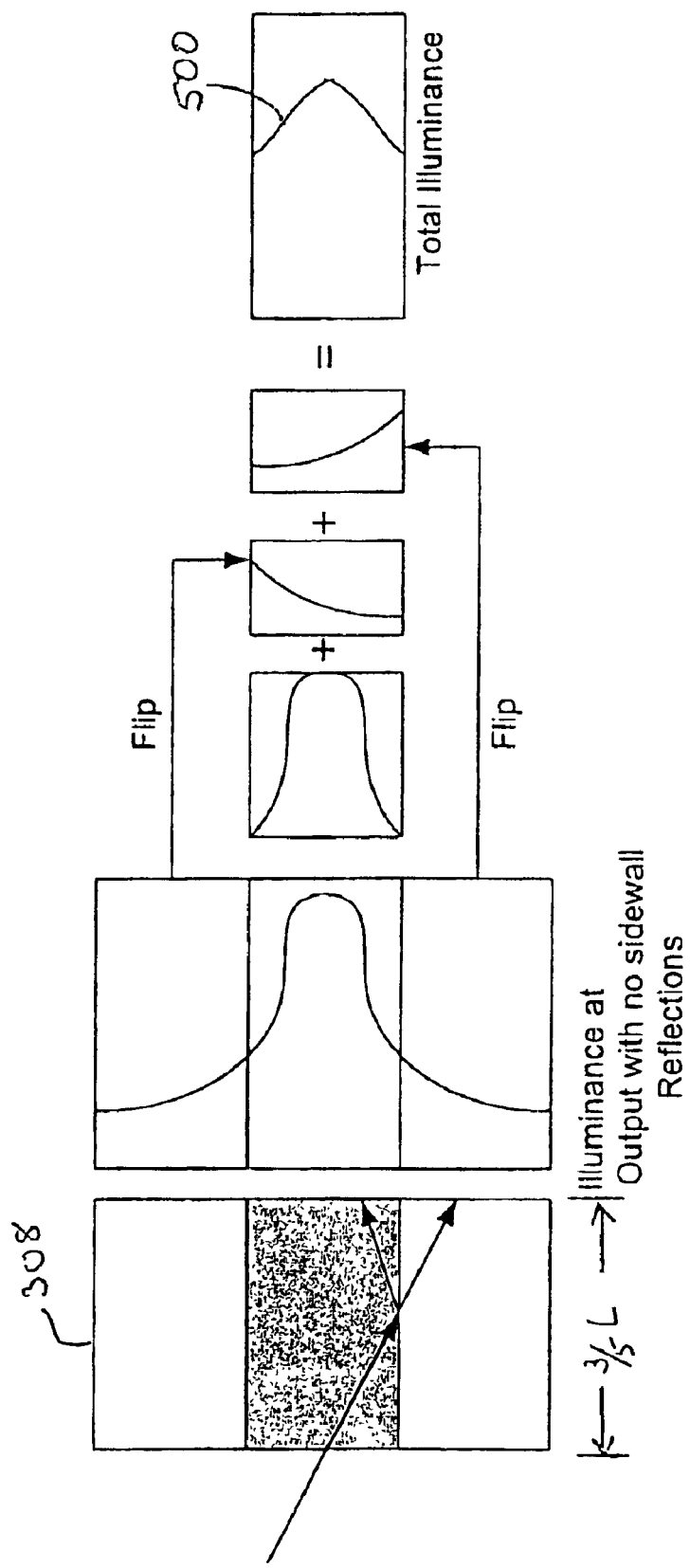
FIG. 5 is a graphical representation of a flip and fold construction that is useful for showing total illuminance produced by an RPTV light engine according to the inventive arrangements.

Referring now to FIG. 4, there is shown the output of integrator 308 of length L and a graphical representation of a flip and fold construction that is useful for showing total illuminance as produced by a conventional RPTV light engine. As illustrated by the figure, the conventional RPTV light engine with an integrator of length L produces a total illuminance plot 400 at its output that is very nearly uniform. By comparison, FIG. 5 is a graphical representation of a flip and fold construction that is useful for showing total illuminance produced by an RPTV light engine according to the inventive arrangements. As shown in FIG. 5, the light pipe overall length is reduced considerably by a factor of about ⅗. The resulting total illumination plot 500 thus produced has an illumination profile which is considerably less uniform. Moreover, the total illumination plot 500 has a peak in the center. Thus, when the light beam is utilized to illuminate an imager 312, the resulting image will be brightest at the center where the increased illumination is most likely to have the greatest effect on the viewer's perception of overall screen brightness.

It will be appreciated by those skilled in the art that there are a variety of ways in which the uniformity of light beam intensity can be controlled to produce a peak in the center. Accordingly, the embodiments described herein relative to FIGS. 3-5 should be understood to be exemplary rather than limiting the invention in any way. Any suitable optical processing scheme can be utilized for this purpose provided that it causes an increase in light intensity at a center of the beam illuminating the imager 312 and a decrease in brightness in a direction toward a peripheral edge of the beam.

What is claimed is:

1. In an RPTV engine, a method for producing an increase In display brightness without an actual Increase in total light output, comprising:

generating light using an illumination source;

optically processing said light generated by said illumination source to produce a light beam of rectangular format with an intensity that is non-uniform, varying from a peak intensity at a center of the beam to a minimum intensity at a periphery of said beam, wherein the intensity decreases by at least about 30% to 70% from said beak intensity to said minimum intensity; and projecting said light on at least one imager of an RPTV engine.

2. The method according to claim 1 wherein said optical processing step further comprises projecting said light beam through an integrator, and wherein said intensity is at least partially controlled by a length of said integrator.

3. The method according to claim 2 wherein said integrator is selectively decreased in length for reduced uniformity.

4. An RPTV engine for providing an apparent increase in display brightness without an actual Increase in total light output, comprising:

an illumination source for generating light;

an optical processor, said optical processor converting said light generated by said illumination source to a light beam of rectangular format with an intensity that is non-uniform and varying from a peak intensity at a center of the beam to a minimum intensity at a periphery of said beam, wherein the intensity decreases by at least about 30% to 70% from said peak intensity to said minimum intensity; and at least one imager of an RPTV engine upon which said light beam is projected.

5. The apparatus according to claim 4 wherein said optical processor comprises a light integrator, said light integrator varying said intensity of the light beam to selectively produce an illumination profile which decreases by at least about 30% to 70% from said peak intensity to said minimum intensity.

6. The apparatus according claim 5 wherein said light integrator is an integrator, and said optical processor further comprises a lens for projecting said light beam through said integrator.

7. The apparatus according to claim 6 wherein said Illumination profile is selectively determined based at least in part on a length of said integrator.

8. The apparatus according to claim 7 wherein said integrator is selectively decreased in length for reduced uniformity.

\* \* \* \* \*